United States Patent
Li et al.

(10) Patent No.: US 11,351,985 B2
(45) Date of Patent: Jun. 7, 2022

(54) VEHICLE STEERING CONTROL METHOD, DEVICE AND SYSTEM, AND VEHICLE

(71) Applicant: Guangzhou Automobile Group Co., Ltd., Guangdong (CN)

(72) Inventors: Saisai Li, Guangdong (CN); Wei Xu, Guangdong (CN); Liang Huang, Guangdong (CN); Huantao Li, Guangdong (CN); Qili Li, Guangdong (CN)

(73) Assignee: GUANGZHOU AUTOMOBILE GROUP CO., LTD., Guangzhou (CN)

(*) Notice: Subject to any disclaimer, the term of this patent is extended or adjusted under 35 U.S.C. 154(b) by 134 days.

(21) Appl. No.: 16/343,780

(22) PCT Filed: Oct. 23, 2018

(86) PCT No.: PCT/CN2018/111500
§ 371 (c)(1),
(2) Date: Apr. 22, 2019

(87) PCT Pub. No.: WO2019/105153
PCT Pub. Date: Jun. 6, 2019

(65) Prior Publication Data
US 2021/0370914 A1    Dec. 2, 2021

(30) Foreign Application Priority Data
Nov. 28, 2017 (CN) .......................... 201711218717.3

(51) Int. Cl.
| B60W 30/045 | (2012.01) |
| B60W 10/18 | (2012.01) |
| B60W 10/20 | (2006.01) |
| B60T 8/1755 | (2006.01) |
| B60T 8/32 | (2006.01) |

(52) U.S. Cl.
CPC ........ *B60W 30/045* (2013.01); *B60W 10/182* (2013.01); *B60W 10/20* (2013.01);
(Continued)

(58) Field of Classification Search
CPC .. B60W 30/045; B60W 10/182; B60W 10/20; B60W 2520/10; B60W 2520/12;
(Continued)

(56) References Cited

U.S. PATENT DOCUMENTS

| 5,295,550 A | 3/1994 | Chikuma | |
| 2002/0053828 A1* | 5/2002 | Shimizu | B60T 8/3275 303/113.4 |
| 2005/0216161 A1* | 9/2005 | Sakugawa | B60W 10/18 701/70 |
| 2008/0059037 A1 | 3/2008 | Isaji et al. | |
| 2013/0131925 A1 | 5/2013 | Isaji et al. | |

(Continued)

FOREIGN PATENT DOCUMENTS

| CN | 1672973 A | 9/2005 |
| CN | 1721244 A | 1/2006 |

(Continued)

*Primary Examiner* — Jason Holloway
(74) *Attorney, Agent, or Firm* — ScienBiziP, P.C.

(57) ABSTRACT

A vehicle steering control method, device and system, and a vehicle are provided. The vehicle steering control method includes: in a case where a current vehicle speed is less than a turning vehicle speed threshold, steering of a vehicle is controlled by an Electric Power Steering (EPS) to implement cornering of the vehicle; in a case where a cornering condition of the vehicle is not reached during the cornering of the vehicle, the vehicle is controlled by an Electrical Park Brake (EPB) to perform single-side parking to assist in the cornering of the vehicle; and after the single-side parking of the vehicle is implemented, closed-loop control is performed on an electric control booster, the EPB and the EPS, and the vehicle is controlled to turn under the cornering condition.

16 Claims, 4 Drawing Sheets

(52) U.S. Cl.
CPC ............ *B60T 8/1755* (2013.01); *B60T 8/321* (2013.01); *B60W 2520/10* (2013.01); *B60W 2520/12* (2013.01); *B60W 2710/182* (2013.01); *B60W 2710/20* (2013.01); *B60W 2720/10* (2013.01); *B60W 2720/12* (2013.01)

(58) Field of Classification Search
CPC ....... B60W 2710/182; B60W 2710/20; B60W 2720/10; B60W 2720/12; B60T 8/1755; B60T 8/321; B62D 6/00; B62D 11/00; B62D 11/02
See application file for complete search history.

(56) References Cited

U.S. PATENT DOCUMENTS

| | | | |
|---|---|---|---|
| 2013/0253793 A1* | 9/2013 | Lee | B62D 9/005 |
| | | | 701/70 |
| 2018/0251106 A1* | 9/2018 | Kasteel | B60T 8/176 |

FOREIGN PATENT DOCUMENTS

| | | | | |
|---|---|---|---|---|
| CN | 101074015 A | 11/2007 | | |
| CN | 101631708 A | 1/2010 | | |
| CN | 101941427 A | 1/2011 | | |
| CN | 102826091 A | 12/2012 | | |
| CN | 104149759 A | 11/2014 | | |
| CN | 106740811 A | 5/2017 | | |
| DE | 10348392 A1 * | 5/2005 | ................ | B60T 7/12 |
| EP | 1604877 A1 | 12/2005 | | |
| KR | 20170064916 A | 6/2017 | | |

\* cited by examiner

VEHICLE STEERING CONTROL METHOD, DEVICE AND SYSTEM, AND VEHICLE

TECHNICAL FIELD

The present disclosure relates to the technical field of intelligent driving, and more particularly to a vehicle steering control method, device and system, and a vehicle.

BACKGROUND

Currently, a wide variety of vehicles are widely used in daily life. Steering is one of the most basic functions of a vehicle. In order to achieve this function, it is necessary to install a steering system in the vehicle, that is, a series of devices for changing or maintaining a heading direction or reversing direction. Vehicle steering systems in related technologies typically use a steering wheel in combination with other devices to achieve vehicle steering. Under the condition that the curve has a small radius during the driving process of the vehicle, the vehicle is generally controlled in a manner of reducing the vehicle speed and turning the steering wheel to one side to the maximum extent to obtain a minimum cornering radius for turning.

However, this approach in the related technology cannot guarantee that the vehicle can successfully turn on a curve with a smaller radius, and the steering control effect is poor.

SUMMARY

In view of the above problem, a vehicle steering control method, device and system, and a vehicle are provided to solve the problem of poor steering control effect.

Embodiments of the present disclosure provide a vehicle steering control method, including the operations as follows.

In a case where a current vehicle speed is less than a turning vehicle speed threshold, an Electric Power Steering (EPS) controls steering of a vehicle to implement cornering of the vehicle.

In a case where a cornering condition of the vehicle is not reached during the cornering of the vehicle, an Electrical Park Brake (EPB) controls the vehicle to perform single-side parking to assist in the cornering of the vehicle.

After the single-side parking of the vehicle is implemented, closed-loop control is performed on an electric control booster, the EPB and the EPS, and the vehicle is controlled to turn under the cornering condition.

According to the vehicle steering control method, when the current vehicle speed is less than the turning vehicle speed threshold, the EPS controls cornering. During the cornering of the vehicle, the EPB controls the vehicle to perform single-side parking and assists in closed-loop control on the electric control booster, the EPB and the EPS to control the vehicle to turn under the cornering condition. An optimal minimum cornering radius is obtained, the maneuverability and turning condition of a vehicle are increased, and the control effect of vehicle steering is improved.

Before controlling the steering of the vehicle by the EPS, the vehicle steering control method in one embodiment further includes the operations as follows.

When the vehicle is monitored to be about to perform the cornering, in a case where the current vehicle speed is not less than the turning vehicle speed threshold, the vehicle is decelerated by the electric control booster to control the current vehicle speed to be less than the turning vehicle speed threshold.

The vehicle steering control method in another embodiment further includes the operations as follows.

A current cornering radius of the vehicle is acquired.

In a case where the current cornering radius is greater than a cornering radius threshold corresponding to a current working condition, it is determined that the cornering condition of the vehicle is not reached.

Optionally, according to the vehicle steering control method in an exemplary embodiment, the operation of controlling the vehicle by the EPB to perform single-side parking includes the operation as follows.

The EPB controls a clamping force of a left rear wheel or a right rear wheel of the vehicle to implement the single-side parking of the vehicle.

For example, according to the vehicle steering control method in an exemplary embodiment, the operation of performing the closed-loop control on the electric control booster, the EPB and the EPS includes the operations as follows.

Real-time control parameters of the electric control booster, the EPB and the EPS are acquired.

Closed-loop control is performed on the electric control booster, the EPB and the EPS according to the real-time control parameters.

In addition, the embodiments of the present disclosure provide a vehicle steering control device based on the vehicle steering control method, including:

a steering control module, configured to control, in a case where a current vehicle speed is less than a turning vehicle speed threshold, steering of a vehicle by an EPS to implement cornering of the vehicle;

a parking brake module, configured to control, in a case where a cornering condition of the vehicle is not reached during the cornering of the vehicle, the vehicle by an EPB to perform single-side parking to assist in the cornering of the vehicle; and a closed-loop control module, configured to perform, after the single-side parking of the vehicle is implemented, closed-loop control on an electric control booster, the EPB and the EPS, and control the vehicle to turn under the cornering condition.

According to the vehicle steering control device, the EPB controls the vehicle to perform single-side parking and assists in closed-loop control on the electric control booster, the EPB and the EPS to control the vehicle to turn under the cornering condition. An optimal minimum cornering radius is obtained, the maneuverability and turning condition of a vehicle are increased, and the control effect of vehicle steering is improved.

The embodiments of the present disclosure also provide a vehicle steering control device, further including:

a deceleration module, configured to decelerate, when the vehicle is monitored to be about to perform the cornering, in a case where the current vehicle speed is not less than the turning vehicle speed threshold, the vehicle by the electric control booster to control the current vehicle speed to be less than the turning vehicle speed threshold.

In an aspect, the embodiments of the present disclosure provide a vehicle steering control system, including: a sensing device, a controller and an execution system, wherein the sensing device is connected to the execution system through the controller.

The sensing device is configured to monitor a running state of a vehicle in real time in a running process of the vehicle, and feed back the running state of the vehicle to the controller.

The controller is configured to perform the operations of the vehicle steering control method, and output a control command to the execution system.

The execution system is configured to execute the control command sent by the controller.

According to the vehicle steering control system, the EPB controls the vehicle to perform single-side parking and assists in closed-loop control on the electric control booster, the EPB and the EPS to control the vehicle to turn under the cornering condition. An optimal minimum cornering radius is obtained, the maneuverability and turning condition of a vehicle are increased, and the control effect of vehicle steering is improved.

Further, the embodiments of the present disclosure also provide a vehicle steering control system. The execution system includes: an electric control booster, an EPB and an EPS, wherein the electric control booster, the EPB and the EPS are in communicative connection with the controller, respectively.

Furthermore, the embodiments of the present disclosure also provide a vehicle, including: the above vehicle steering control system.

The above vehicle increases the maneuverability and turning condition of a vehicle and improves the control effect of vehicle steering.

DETAILED DESCRIPTION OF THE EMBODIMENTS

In order to make the purposes, technical solutions and advantages of the present disclosure clearer, the present disclosure will be further described in detail below with reference to the accompanying drawings and embodiments. It is to be understood that the specific embodiments described herein are merely illustrative of the present disclosure and are not intended to limit the present disclosure.

A vehicle steering control method according to an embodiment of the present disclosure may be used for controlling a cornering radius of a vehicle by performing closed-loop control on an electric control booster (e.g., iBooster), an EPB and an EPS in the turning process of the vehicle.

The embodiment of the vehicle steering control method will be described below with reference to FIG. 1.

Figure 1:
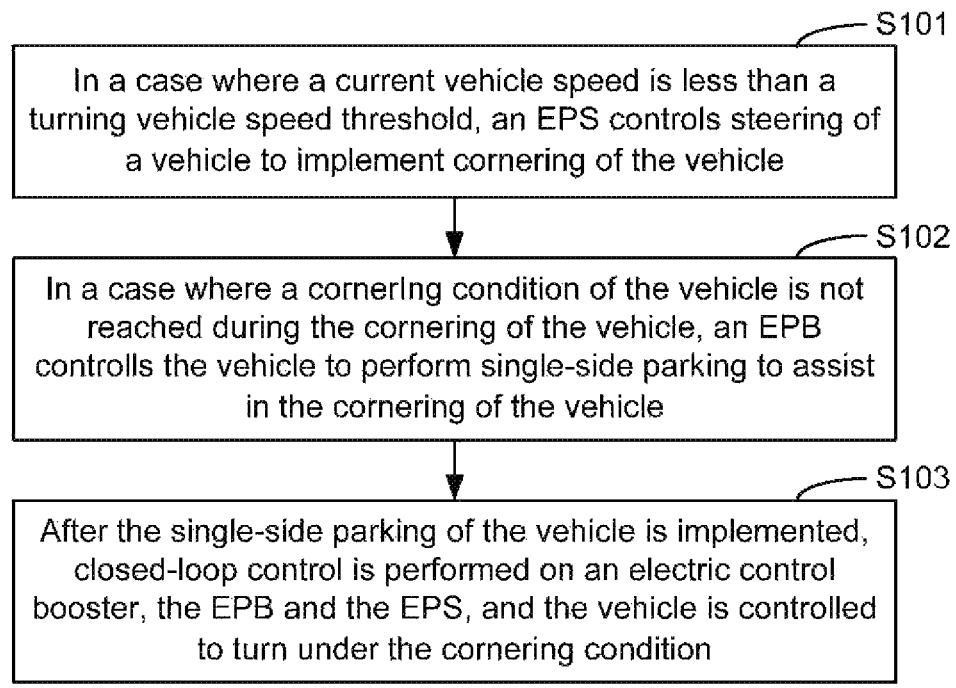
FIG. 1 is a schematic step diagram of a vehicle steering control method according to an embodiment of the present disclosure.

FIG. 1 is a schematic step diagram of a vehicle steering control method according to an embodiment of the present disclosure. The method includes the operations as follows.

At S101, in a case where a current vehicle speed is less than a turning vehicle speed threshold, an EPS controls steering of a vehicle to implement cornering of the vehicle.

For operation S101, in one embodiment, before the EPS controls the steering of the vehicle, the method may further include that: when the vehicle is monitored to be about to perform the cornering, in a case where the current vehicle speed is not less than the turning vehicle speed threshold, the vehicle is decelerated by the electric control booster to control the current vehicle speed to be less than the turning vehicle speed threshold.

Specifically, a monitoring system may be used to judge whether turning is in a cornering state. The monitoring system may include a cloud map, and it may be determined whether turning is in the cornering state according to a driving route provided by the cloud map for the driving of the vehicle and the driver's input to a steering wheel. The turning speed threshold may be 30 km/h, i.e., the maximum speed of the vehicle running on a curve cannot exceed 30 km/h. With the Booster, the vehicle can be quickly decelerated, so that the vehicle can reach a turning speed requirement at the fastest time to ensure the safety of driving.

At S102, in a case where a cornering condition of the vehicle is not reached during the cornering of the vehicle, an EPB controls the vehicle to perform single-side parking to assist in the cornering of the vehicle.

In one embodiment, the EPB controls the vehicle to perform single-side parking in a manner as follows: the EPB controls a clamping force of a left rear wheel or a right rear wheel of the vehicle to implement the single-side parking of the vehicle, and a rear brake clamp can be used for parking brake of the vehicle.

In the above embodiment, the vehicle can be decelerated by the iBooster during the turning process. If the cornering condition is not reached after the deceleration, the single-side parking of the vehicle is implemented, so that the driving process can be smoother, and the driver has a more comfortable experience.

In one embodiment, whether the cornering condition of the vehicle is reached may be judged by the following operations: a current cornering radius of the vehicle is acquired; and in a case where the current cornering radius is greater than a cornering radius threshold corresponding to a current working condition, it is determined that the cornering condition of the vehicle is not reached.

In the above embodiment, the cornering condition may be an optimal minimum cornering radius of the vehicle. At the current vehicle speed, the optimal minimum cornering radius of the vehicle is acquired in combination with the working conditions during the turning, wherein the turning condition is e.g., a steering guide line on a road during the turning, and whether there is an obstacle near the corner.

When the cornering condition of the vehicle is not reached, the EPB assists in the cornering of the vehicle, so that the vehicle can reach the cornering condition faster and more accurately, and ensure the safe driving of the vehicle.

At S103, after the single-side parking of the vehicle is implemented, closed-loop control is performed on an electric control booster, the EPB and the EPS, and the vehicle is controlled to turn under the cornering condition.

For operation S103, the closed-loop control refers to a control relationship that a controlled output is returned to a control input end in a certain manner and a control influence is exerted on the input end, where an output end is fed back to the input end and participates in re-controlling the output end.

According to the vehicle steering control method, when the current vehicle speed is less than the turning vehicle speed threshold, the EPS controls cornering. During the cornering of the vehicle, the EPB controls the vehicle to perform single-side parking and assists in closed-loop control on the electric control booster, the EPB and the EPS to control the vehicle to turn under the cornering condition. An optimal minimum cornering radius is obtained, the maneuverability and turning condition of a vehicle are increased, and the control effect of vehicle steering is improved. Moreover, the vehicle is decelerated, the single-side parking of the vehicle is implemented after the deceleration, the iBooster, the EPB and the EPS are controlled to work together, and closed-loop adjustment is continuously performed to ensure a smoother driving process and a more comfortable experience for the driver.

According to the vehicle steering control method in an exemplary embodiment, the operation of performing the closed-loop control on the electric control booster, the EPB and the EPS includes the operations as follows.

Real-time control parameters of the electric control booster, the EPB and the EPS are acquired.

Closed-loop control is performed on the electric control booster, the EPB and the EPS according to the real-time control parameters.

In the above embodiment, control parameters (such as the cornering radius and the clamping force) of the controller (such as the EPS and the EPB) can be calibrated according to the setting under the working condition to obtain a calibration value. In the real vehicle control, working condition parameters are acquired in real time, and specific controller parameters can be obtained for real-time closed-loop control by looking up calibration data. The calibration value is an optimal parameter threshold. Specifically, according to the input of a radar and a camera and the logic of domain control software, the parameters can be continuously adjusted to verify whether the working conditions are satisfied until the parameters meet the working conditions. In addition, specific working conditions may include parking lots, urban and rural irregular roads, and the like.

According to the vehicle steering control method, the EPB controls the vehicle to perform single-side parking and assists in closed-loop control on the electric control booster, the EPB and the EPS to control the vehicle to turn under the cornering condition. An optimal minimum cornering radius is obtained, the maneuverability and turning condition of a vehicle are increased, and the control effect of vehicle steering is improved. Moreover, the vehicle is decelerated, the single-side parking of the vehicle is implemented after the deceleration, the iBooster, the EPB and the EPS are controlled to work together, and closed-loop adjustment is continuously performed to ensure a smoother driving process and a more comfortable experience for the driver.

Figure 2:
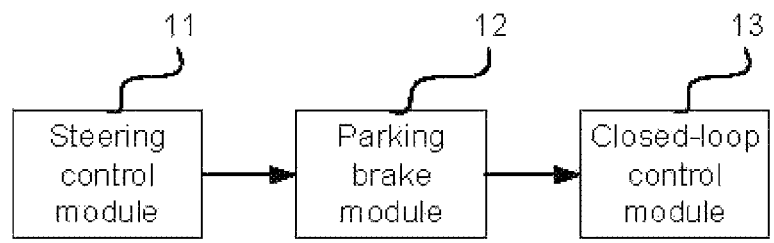
FIG. 2 is a schematic structure diagram of a vehicle steering control device according to an embodiment of the present disclosure.

In addition, as shown in FIG. 2, the embodiment of the present disclosure provides a vehicle steering control device, including: a steering control module 11, a parking brake module 12 and a closed-loop control module 13.

The steering control module 11 is configured to control, in a case where a current vehicle speed is less than a turning vehicle speed threshold, steering of a vehicle by an EPS to implement cornering of the vehicle.

For the steering control module 11, in one embodiment, before the EPS controls the steering of the vehicle, the device may further include: a deceleration module, configured to decelerate, when the vehicle is monitored to be about to perform the cornering, in a case where the current vehicle speed is not less than the turning vehicle speed threshold, the vehicle by the electric control booster to control the current vehicle speed to be less than the turning vehicle speed threshold.

Specifically, a monitoring system may be used to judge whether turning is in a cornering state, wherein the monitoring system may include a cloud map, and whether turning is in the cornering state may be judged according to a driving route provided by the cloud map for the driving of the vehicle and the driver's input to a steering wheel. The turning speed threshold may be 30 km/h, i.e., the maximum speed of the vehicle running on a curve cannot exceed 30 km/h. With the iBooster, the vehicle can be quickly decelerated, so that the vehicle can reach a turning speed requirement at the fastest time to ensure the safety of driving.

The parking brake module 12 is configured to control, in a case where a cornering condition of the vehicle is not reached during the cornering of the vehicle, the vehicle by an EPB to perform single-side parking to assist in the cornering of the vehicle.

In one embodiment, the EPB controls the vehicle to perform single-side parking in a manner as follows: the EPB controls a clamping force of a left rear wheel or a right rear wheel of the vehicle to implement the single-side parking of the vehicle.

In the above embodiment, the vehicle can be decelerated by the iBooster during the turning process. If the cornering condition is not reached after the deceleration, the single-side parking of the vehicle is implemented, so that the driving process can be smoother, and the driver has a more comfortable experience.

In one embodiment, whether the cornering condition of the vehicle is reached may be judged by the following operations: a current cornering radius of the vehicle is acquired; and in a case where the current cornering radius is greater than a cornering radius threshold corresponding to a current working condition, it is determined that the cornering condition of the vehicle is not reached.

In the above embodiment, the cornering condition may be an optimal minimum cornering radius of the vehicle. At the current vehicle speed, the optimal minimum cornering radius of the vehicle is acquired in combination with the working conditions during the turning, wherein the turning condition is e.g., a steering guide line on a road during the turning, and whether there is an obstacle near the corner.

When the cornering condition of the vehicle is not reached, the EPB assists the vehicle in cornering, so that the vehicle can reach the cornering condition faster and more accurately, and ensure the safe driving of the vehicle.

The closed-loop control module 13 is configured to perform, after the single-side parking of the vehicle is implemented, closed-loop control on an electric control booster, the EPB and the EPS, and control the vehicle to turn under the cornering condition.

For the closed-loop control module 13, the closed-loop control refers to a control relationship that a controlled output is returned to a control input end in a certain manner and a control influence is exerted on the input end, where an output end is fed back to the input end and participates in re-controlling the output end.

According to the vehicle steering control method, the EPB controls the vehicle to perform single-side parking and assists in closed-loop control on the electric control booster, the EPB and the EPS to control the vehicle to turn under the cornering condition. An optimal minimum cornering radius is obtained, the maneuverability and turning condition of a vehicle are increased, and the control effect of vehicle steering is improved. Moreover, the vehicle is decelerated, the single-side parking of the vehicle is implemented after the deceleration, the IBooster, the EPB and the EPS are controlled to work together, and closed-loop adjustment is continuously performed to ensure a smoother driving process and a more comfortable experience for the driver.

In an aspect, the embodiment of the present disclosure provides a vehicle steering control system, including: a sensing device, a controller and an execution system.

The sensing device is connected to the execution system through the controller; the sensing device is configured to monitor a running state of a vehicle in real time in a running process of the vehicle, and feed back the running state of the vehicle to the controller; the controller is configured to perform the operations of the vehicle steering control method, and output a control command to the execution system; and the execution system is configured to execute the control command sent by the controller.

Figure 3:
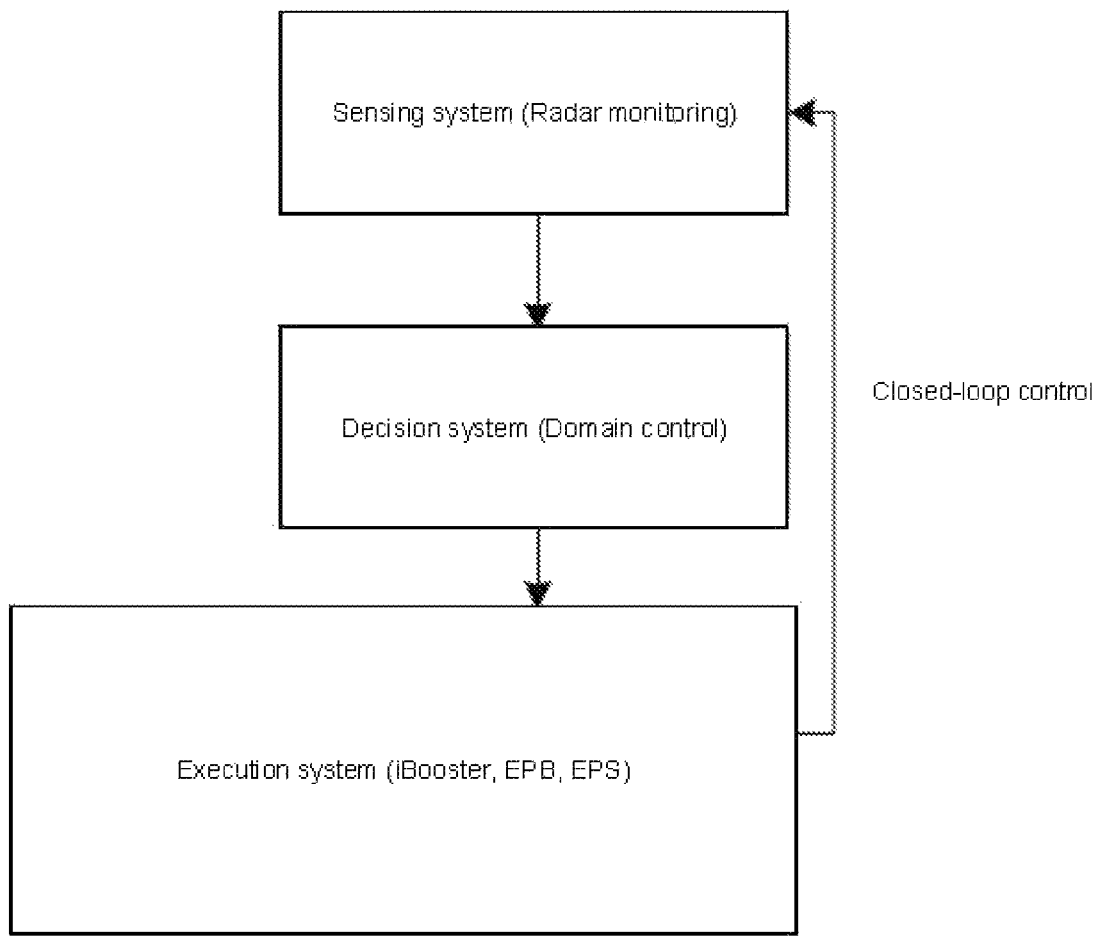
FIG. 3 is a schematic structure diagram of a vehicle steering control system according to an embodiment of the present disclosure.

In the above embodiment, the sensing device may be a radar or a camera sensor, and the sensing device may also be referred to as a sensing system. The controller may be a domain controller or a decision system. The execution system may be the iBooster, the EPB and the EPS. For example, FIG. 3 is a schematic structure diagram of a vehicle steering control system. By continuously performing closed-loop control, the vehicle is controlled to turn under the cornering condition.

Figure 4:
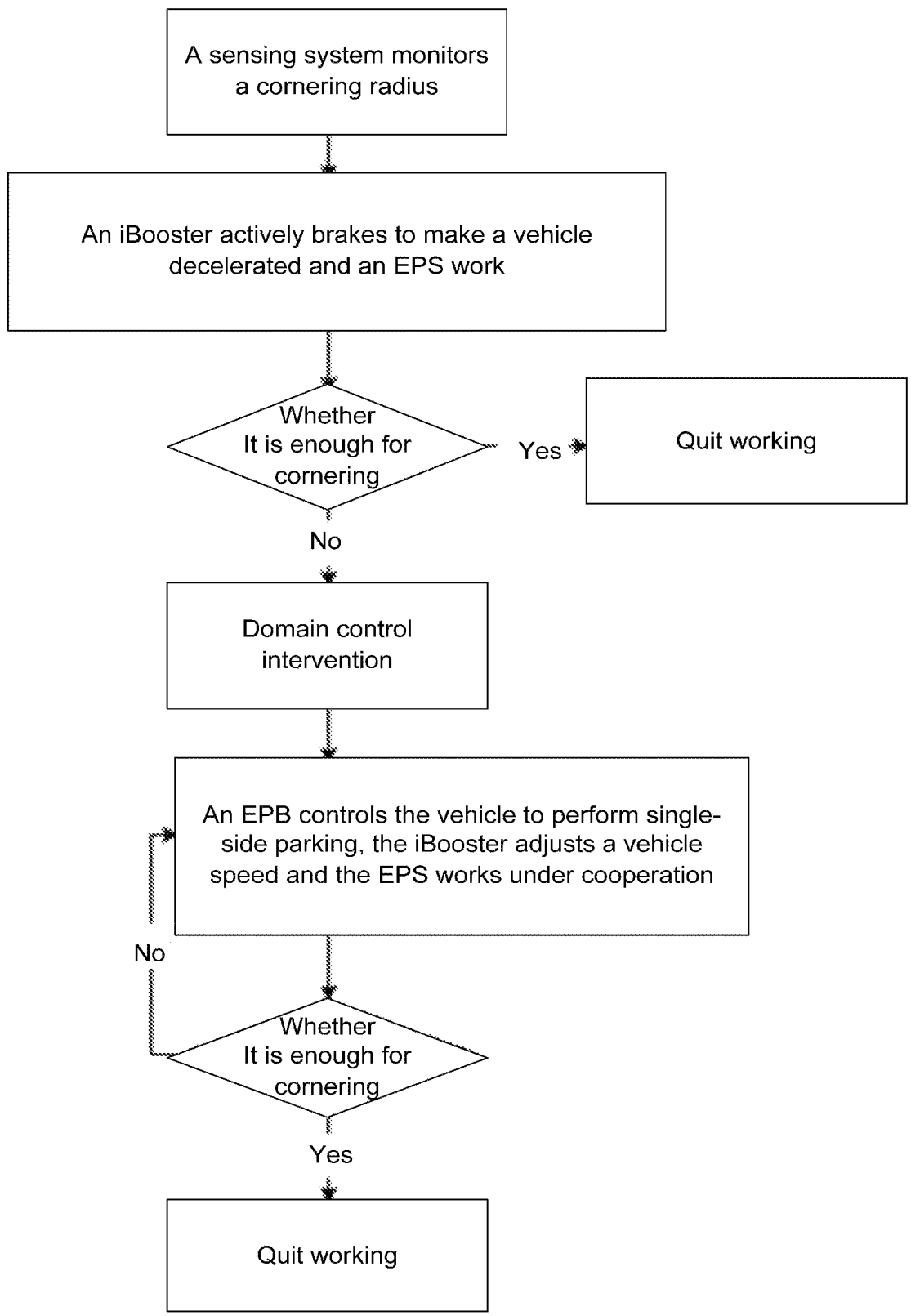
FIG. 4 is a working flowchart of a vehicle steering control system according to an embodiment of the present disclosure.

A working flowchart of a vehicle steering control system in one embodiment is shown in FIG. 4. A cornering radius can be monitored by a sensing system such as a radar or a camera, and then input to a decision system. If cornering cannot be performed, a first control signal is sent to the execution system to control the iBooster to brake and the EPS to work, while the radar, the camera and other sensing systems continue to monitor the cornering radius in real time. If cornering still cannot be performed, the decision system sends a second control signal to make the EPB to implement the single-side parking of the vehicle, while the iBooster brakes and the EPS works, and the radar, the camera and other sensing systems continue to monitor the cornering radius in real time. If cornering still cannot be performed, the decision system continues to send the second control signal to achieve closed-loop control.

According to the vehicle steering control system, the EPB controls the vehicle to perform single-side parking and assists in closed-loop control on the electric control booster, the EPB and the EPS to control the vehicle to turn under the cornering condition. An optimal minimum cornering radius is obtained, the maneuverability and turning condition of a vehicle are increased, and the control effect of vehicle steering is improved.

Figure 5:
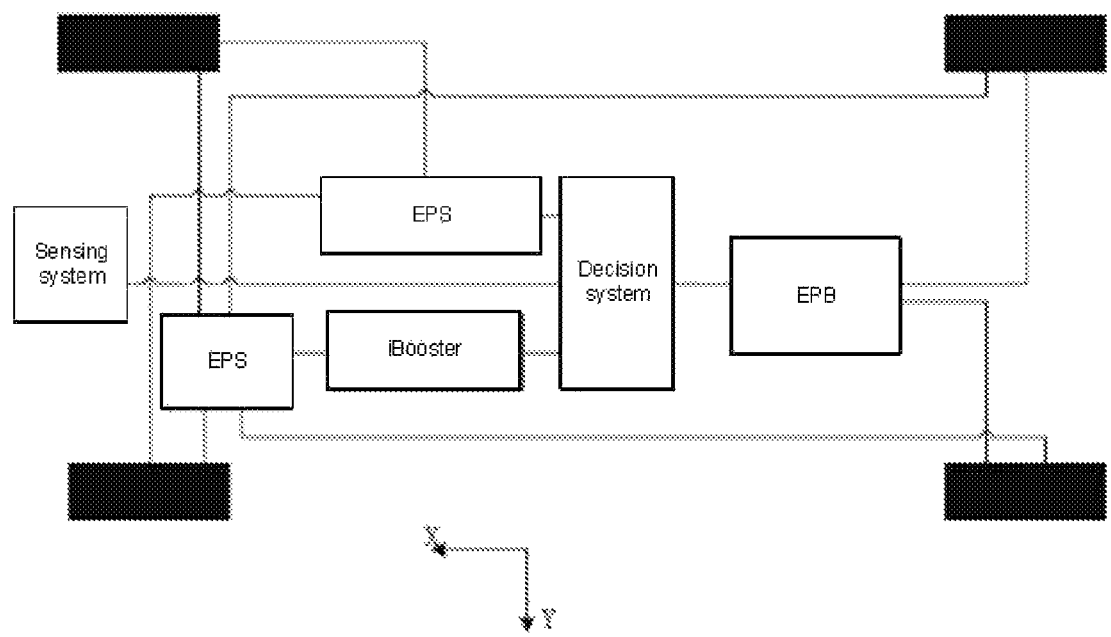
FIG. 5 is a schematic assembly diagram of a vehicle steering control system according to an embodiment of the present disclosure.

Further, as shown in FIG. 5, the embodiment of the present disclosure also provides a vehicle steering control system. The execution system includes:

an electric control booster, an EPB and an EPS.

The electric control booster, the EPB and the EPS are in communicative connection with the controller, respectively.

In the above embodiment, the iBooster, the EPB and the EPS are in communicative connection with the controller (i.e., a decision system) respectively, the EPB is mechanically connected to two rear wheels of the vehicle respectively, the EPS is mechanically connected to two front wheels of the vehicle respectively, and an Electronic Stability Program (ESP) of the electric control booster is connected to the four wheels of the vehicle respectively. In FIG. 5, the direction of an X axis is the direction of a front wheel of a vehicle, and four black rectangles represent four wheels of the vehicle.

The execution system is configured to judge whether the vehicle is about to turn according to the running state, when the vehicle is monitored to be about to perform the cornering and a current vehicle speed is less than a preset vehicle speed threshold, the EPS controls the steering and cornering of the vehicle; if the cornering condition is not reached, the EPB controls the vehicle to perform single-side parking, and the electric control booster, the EPB and the EPS are cooperatively controlled after the single-side parking of the vehicle is implemented until the cornering condition of the vehicle is reached. Moreover, the stability of the vehicle is controlled by the ESP.

The above vehicle increases the maneuverability and turning condition of a vehicle and improves the control effect of vehicle steering.

Furthermore, the embodiments of the present disclosure also provide a vehicle, including: the above vehicle steering control system. The vehicle may be a four-wheel motor vehicle.

According to the vehicle, the EPB controls the vehicle to perform single-side parking and assists in closed-loop control on the electric control booster, the EPB and the EPS to control the vehicle to turn under the cornering condition. An optimal minimum cornering radius is obtained, the maneuverability and turning condition of a vehicle are increased, and the control effect of vehicle steering is improved.

The vehicle steering control system of the present disclosure has a one-to-one correspondence with the vehicle steering control method of the present disclosure, and the technical features and advantages thereof described in the embodiment of the vehicle steering control method are applicable to the embodiment of the vehicle steering control system, which may be hereby declared.

In the description of the present specification, the description with reference to the terms "one embodiment", "some embodiments", "example", "specific example", or "some examples" and the like means that specific features, structures, materials or characteristics described in connection with the embodiment or example is included in at least one embodiment or example of the present disclosure. In the present specification, the schematic representation of the above terms does not necessarily mean the same embodiment or example. Furthermore, the specific features, structures, materials, or characteristics described may be combined in a suitable manner in any one or more embodiments or examples.

The technical features of the above-described embodiments may be arbitrarily combined. For the sake of brevity of description, all possible combinations of the technical features in the above embodiments are not described. However, as long as there is no contradiction between the combinations of these technical features, all should be considered as the scope of this description.

The above embodiments are merely illustrative of several implementation manners of the present disclosure with specific and detailed description, and are not to be construed as limiting the patent scope of the present disclosure. It is to be noted that a number of variations and modifications may be made by those of ordinary skill in the art without departing from the conception of the present disclosure, and all fall within the scope of protection of the present disclosure. Therefore, the scope of protection of the present disclosure should be determined by the appended claims.

What is claimed is:

1. A vehicle steering control method, comprising:
   in a case where a current vehicle speed is less than a turning vehicle speed threshold, controlling steering of a vehicle by an Electric Power Steering (EPS) to implement cornering of the vehicle;

in a case where a cornering condition of the vehicle is not reached during the cornering of the vehicle, controlling the vehicle by an Electrical Park Brake (EPB) to perform single-side parking to assist in the cornering of the vehicle; and after the single-side parking of the vehicle is implemented, performing closed-loop control on an electric control booster, the EPB and the EPS, and controlling the vehicle to turn under the cornering conditions;

the method further comprising:

acquiring a current cornering radius of the vehicle; and in a case where the current cornering radius is greater than a cornering radius threshold corresponding to a current working condition, determining that the cornering condition of the vehicle is not reached, wherein the cornering condition is an optimal minimum cornering radius of the vehicle which is acquired at the current vehicle speed in combination with the working conditions during the turning.

2. The vehicle steering control method as claimed in claim 1, wherein before controlling the steering of the vehicle by the EPS, the method further comprises:

when the vehicle is monitored to be about to perform the cornering, in a case where the current vehicle speed is not less than the turning vehicle speed threshold, decelerating the vehicle by the electric control booster to control the current vehicle speed to be less than the turning vehicle speed threshold.

3. The vehicle steering control method as claimed in claim 1, wherein controlling the vehicle by the EPB to perform single-side parking comprises:

controlling a clamping force of a left rear wheel or a right rear wheel of the vehicle by the EPB to implement the single-side parking of the vehicle.

4. The vehicle steering control method as claimed in claim 1, wherein performing the closed-loop control on the electric control booster, the EPB and the EPS comprises:

acquiring real-time control parameters of the electric control booster, the EPB and the EPS; and performing the closed-loop control on the electric control booster, the EPB and the EPS according to the real-time control parameters.

5. A vehicle steering control device, comprising:

a steering control module, configured to control, in a case where a current vehicle speed is less than a turning vehicle speed threshold, steering of a vehicle by an Electric Power Steering (EPS) to implement cornering of the vehicle;

a parking brake module, configured to control, in a case where a cornering condition of the vehicle is not reached during the cornering of the vehicle, the vehicle by an Electrical Park Brake (EPB) to perform single-side parking to assist in the cornering of the vehicle; and a closed-loop control module, configured to perform, after the single-side parking of the vehicle is implemented, closed-loop control on an electric control booster, the EPB and the EPS, and control the vehicle to turn under the cornering condition;

wherein the vehicle steering control device is further configured to:

acquire a current cornering radius of the vehicle; and in a case where the current cornering radius is greater than a cornering radius threshold corresponding to a current working condition, determine that the cornering condition of the vehicle is not reached, wherein the cornering condition is an optimal minimum cornering radius of the vehicle which is acquired at the current vehicle speed in combination with the working conditions during the turning.

6. The vehicle steering control device as claimed in claim 5, further comprising:

a deceleration module, configured to decelerate, when the vehicle is monitored to be about to perform the cornering, in a case where the current vehicle speed is not less than the turning vehicle speed threshold, the vehicle by the electric control booster to control the current vehicle speed to be less than the turning vehicle speed threshold.

7. A vehicle steering control system, comprising: a sensing device, a controller and an execution system, wherein the sensing device is connected to the execution system through the controller;

the sensing device is configured to monitor a running state of a vehicle in real time in a running process of the vehicle, and feed back the running state of the vehicle to the controller;

the controller is configured to perform operations of a vehicle steering control method, and output a control command to the execution system, wherein the operations comprise: in a case where a current vehicle speed is less than a turning vehicle speed threshold, controlling steering of a vehicle by an Electric Power Steering (EPS) to implement cornering of the vehicle; in a case where a cornering condition of the vehicle is not reached during the cornering of the vehicle, controlling the vehicle by an Electrical Park Brake (EPB) to perform single-side parking to assist in the cornering of the vehicle; and after the single-side parking of the vehicle is implemented, performing closed-loop control on an electric control booster, the EPB and the EPS, and controlling the vehicle to turn under the cornering condition; and the execution system is configured to execute the control command sent by the controller;

wherein the operations further comprise:

acquiring a current cornering radius of the vehicle; and in a case where the current cornering radius is greater than a cornering radius threshold corresponding to a current working condition, determining that the cornering condition of the vehicle is not reached, wherein the cornering condition is an optimal minimum cornering radius of the vehicle which is acquired at the current vehicle speed in combination with the working conditions during the turning.

8. The vehicle steering control system as claimed in claim 7, wherein the execution system comprises an electric control booster, an Electrical Park Brake (EPB) and an Electric Power Steering (EPS); and the electric control booster, the EPB and the EPS are in communicative connection with the controller, respectively.

9. A vehicle, comprising: the vehicle steering control system as claimed in claim 7.

10. The vehicle steering control device as claimed in claim 5, wherein the parking brake module is configured to:

control a clamping force of a left rear wheel or a right rear wheel of the vehicle by the EPB to implement the single-side parking of the vehicle.

11. The vehicle steering control device as claimed in claim 5, wherein the closed-loop control module is configured to:

acquire real-time control parameters of the electric control booster, the EPB and the EPS; and perform the closed-loop control on the electric control booster, the EPB and the EPS according to the real-time control parameters.

12. The vehicle steering control system as claimed in claim 7, wherein before controlling the steering of the vehicle by the EPS, the operations further comprise:

when the vehicle is monitored to be about to perform the cornering, in a case where the current vehicle speed is not less than the turning vehicle speed threshold, decelerating the vehicle by the electric control booster to control the current vehicle speed to be less than the turning vehicle speed threshold.

13. The vehicle steering control system as claimed in claim 7, wherein controlling the vehicle by the EPB to perform single-side parking comprises:

controlling a clamping force of a left rear wheel or a right rear wheel of the vehicle by the EPB to implement the single-side parking of the vehicle.

14. The vehicle steering control system as claimed in claim 7, wherein performing the closed-loop control on the electric control booster, the EPB and the EPS comprises:

acquiring real-time control parameters of the electric control booster, the EPB and the EPS; and performing the closed-loop control on the electric control booster, the EPB and the EPS according to the real-time control parameters.

15. A vehicle, comprising: the vehicle steering control system as claimed in claim 8.

16. A vehicle, comprising: the vehicle steering control system as claimed in claim 12.

* * * * *